US008651309B2

(12) United States Patent
Gualersi et al.

(10) Patent No.: US 8,651,309 B2
(45) Date of Patent: Feb. 18, 2014

(54) COLLAPSIBLE CONTAINER (75) Inventors: Enrico Gualersi, San Pedro Garza Garcia (MX); Emilio Libera, Chiari (IT); Patricio Ortiz, San Pedro Garza Garcia (MX)

(73) Assignee: Jorge Ibarra, Laredo, TX (US)

( * ) Notice: Subject to any disclaimer, the term of this patent is extended or adjusted under 35 U.S.C. 154(b) by 61 days.

(21) Appl. No.: 13/333,640

(22) Filed: Dec. 21, 2011

(65) Prior Publication Data

US 2013/0161330 A1    Jun. 27, 2013

(51) Int. Cl.
*B65D 5/36* (2006.01)

(52) U.S. Cl.
USPC .......... 220/4.28; 220/6; 220/613; 229/117.07

(58) Field of Classification Search
USPC ........ 220/4.28, 4.39, 6, 7, 62, 613, 666, 4.33, 220/4.34; 229/117.07; 206/600
See application file for complete search history.

(56) References Cited

U.S. PATENT DOCUMENTS

| | | | | |
|---|---|---|---|---|
| 1,470,898 | A | * | 10/1923 | Webb ................................ 220/6 |
| 2,998,181 | A | | 8/1961 | Chasolen |
| 3,376,994 | A | | 4/1968 | Flinn, Jr. |
| 4,014,292 | A | | 3/1977 | Coughlin et al. |
| D247,651 | S | * | 3/1978 | Carroll et al. .................. D3/314 |
| 4,628,863 | A | * | 12/1986 | Eichenauer ................... 119/168 |
| 4,776,477 | A | * | 10/1988 | Walker ......................... 220/4.28 |
| 4,782,788 | A | * | 11/1988 | Arcand ......................... 119/168 |
| 5,035,205 | A | * | 7/1991 | Schiller et al. ................ 119/168 |
| 5,156,288 | A | * | 10/1992 | Levy ............................. 220/4.29 |
| 5,472,107 | A | | 12/1995 | Lieber |
| 5,524,789 | A | | 6/1996 | Jackman |
| 5,878,881 | A | * | 3/1999 | Hunt .............................. 206/361 |
| 5,918,798 | A | | 7/1999 | Frahm |
| 7,044,319 | B2 | | 5/2006 | Overholt et al. |
| 7,201,421 | B2 | * | 4/2007 | Reynolds et al. ............ 296/37.5 |
| 7,694,836 | B2 | | 4/2010 | Overholt et al. |
| 7,699,212 | B2 | | 4/2010 | Turvey et al. |
| 2002/0092850 | A1 | * | 7/2002 | Iwahara et al. .................... 220/6 |
| 2003/0071039 | A1 | | 4/2003 | Spykerman et al. |
| 2005/0087530 | A1 | | 4/2005 | Svenson |
| 2006/0191929 | A1 | | 8/2006 | Berg, Jr. et al. |
| 2007/0007289 | A1 | | 1/2007 | Hoberman |
| 2007/0144448 | A1 | * | 6/2007 | Fairhall ......................... 119/166 |
| 2009/0044743 | A1 | * | 2/2009 | Wagenknecht et al. ....... 114/354 |

FOREIGN PATENT DOCUMENTS

| | | |
|---|---|---|
| EP | 0733555 A1 | 9/1996 |
| FR | 2562506 | 10/1985 |

OTHER PUBLICATIONS

PCT International Search Report and Written Opinion; International Application No. PCT/US2012/071022; Mailed Dec. 20, 2012.

* cited by examiner

*Primary Examiner* — J. Gregory Pickett
*Assistant Examiner* — Mollie Llewellyn
(74) *Attorney, Agent, or Firm* — Patterson & Sheridan, L.L.P.

(57) ABSTRACT

A collapsible, re-usable container of unitary construction is disclosed. The container is able to be locked into a flat, folded configuration as well as locked into an open, unfolded configuration, and includes a base, two opposing end walls that are pivotably attached to the base, and two opposing side walls, which are pivotably attached to both the base and to the side walls.

8 Claims, 11 Drawing Sheets

COLLAPSIBLE CONTAINER

BACKGROUND OF THE INVENTION

1. Field of the Invention

The present invention relates to a collapsible container, and more particularly to a collapsible, re-usable container of unitary construction that is able to be locked into a flat, folded configuration as well as locked into an open, unfolded configuration.

2. Description of the Related Art

Collapsible containers that are re-usable are extremely useful in both commercial and consumer applications. While there are a variety of collapsible, re-usable containers in the marketplace, all have drawbacks. For example, most collapsible containers are made from a material that is not sturdy. For example, collapsible boxes made from cardboard have a limited lifetime, and can only be re-used a few times. Fabric containers cannot hold extensive weight, and are limited in their usage. Furthermore, when containers are constructed from a thin type of material, the container cannot hold its shape when a larger load is placed within such container.

On the other hand, if a collapsible container happens to be constructed of a heartier material, weight of the container becomes an issue, and the container becomes less versatile and convenient to use. Furthermore, containers with heartier, more durable material are not easily able to be collapsed, and should they be "popped out" to their unfolded state after being stored in its collapsed form, the container has difficulty maintaining its unfolded position.

In addition, collapsible containers are not easily stacked, especially when loaded with items. What is needed is a collapsible container made with from a lightweight, sturdy material, which may be re-used many times, can be easily stacked, both when folded and unfolded, loaded and unloaded, and that can maintain its shape in both its folded and unfolded states.

SUMMARY OF THE INVENTION

The present invention relates to a collapsible, re-usable container of unitary construction that is able to be locked into a flat, folded configuration as well as locked into an open, unfolded configuration. The container comprises a base, two opposing end walls that are pivotably attached to the base, and two opposing side walls, which are pivotably attached to both the base and to the side walls. Portions of the side walls fold into the end walls at a substantially 45 degree angle to allow the container to be placed into its folded configuration, and the height of the end walls may be at least more than one-half the length of the base to allow a top portion of the end walls to overlap and lock when both end walls are collapsed onto the base. When in the open configuration, a flap on a top portion of each side wall folds into the container and locks into the corresponding side wall. Two or more containers in the open configuration may be stacked upon each other by positioning the side walls of each container into a substantially vertical position, and wherein stacking lips located on the base of each container help secure one container on top of another.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
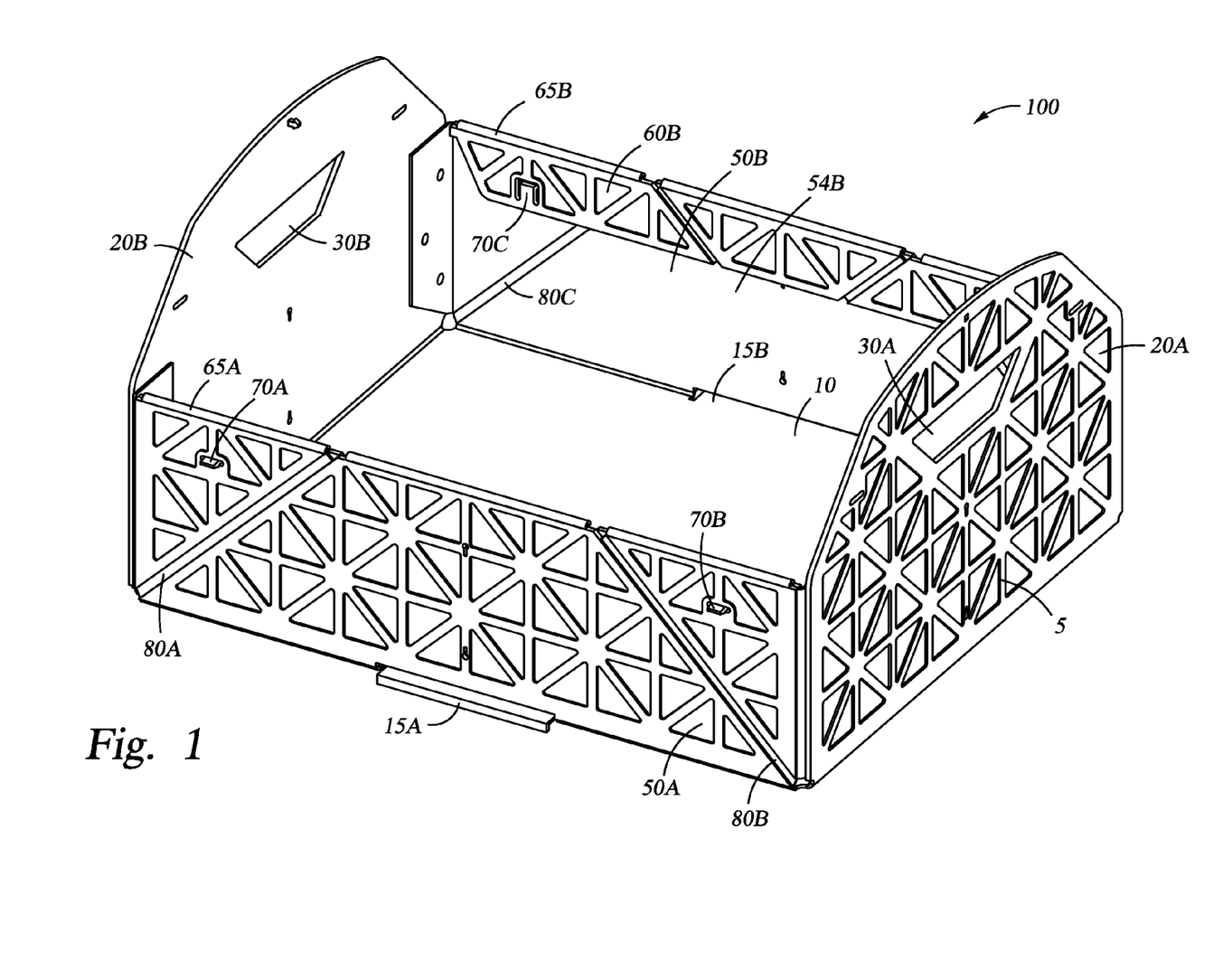
FIG. 1 is a perspective view of one embodiment of a collapsible container in an unfolded state.

The present invention relates to a collapsible, re-usable container of unitary construction that is able to be locked into a flat, folded configuration as well as locked into an open, unfolded configuration. FIG. 1 shows an exemplary embodiment of a collapsible container 100 in an unfolded, locked state. The container 100 includes a base 10, two opposing end walls 20A, B, and two opposing side walls 50A, B. The end walls 20A, B and side walls 50A, B are all pivotably attached to the base 10 and to each other. Flaps 60A, B (FIG. 1 only shows flap 60B) are pivotably attached to the side walls 50A, B, and in FIG. 1, are folded into the container 100, and locked into the side walls 50A, B by locking tabs 70A-D (tab 70D not seen in FIG. 1). When the flaps 60A, B are locked into the side walls 50A, B, the container 100 is stabilized and locked into its unfolded position shown in FIG. 1.

The base 10 may be at least wide enough to the equivalent of two times the height of the side walls 50A, B plus two times the height of the flaps 60A, B so that when the side walls 50A, B and flaps 60A, B are collapsed onto the base 10, those portions lie flat and do not overlap. The base length may be less than two times the height of the end walls 20A, B so that a top portion of the end walls 20A, B may overlap and lock together when in the collapsed position. The base 10 may include two stacking lips 15A, B, which are centrally positioned along its length along each of its sides, and the lips 15A, B extend outward in a length that allows them to sit over a top edge of the side walls 50A, B when the flaps 60A, B are folded inward.

The end walls 20A, B may include handles 30A, B so that the container 100 may easily be toted in its unfolded position. The end walls 20A, B may be completely rigid, and may not pivot except at the locations where the end walls 20A, B adjoin the base 10 and the side walls 50A, B. On the other hand, the side walls 50A, B, in addition to pivoting about the locations where the side walls 20A, B adjoin the base 10 and the end walls 20A, B, may also pivot along folding hinges 80A-D (hinge 80D not seen in FIG. 1) in order to collapse the container 100, as will be discussed herein.

Figure 2:
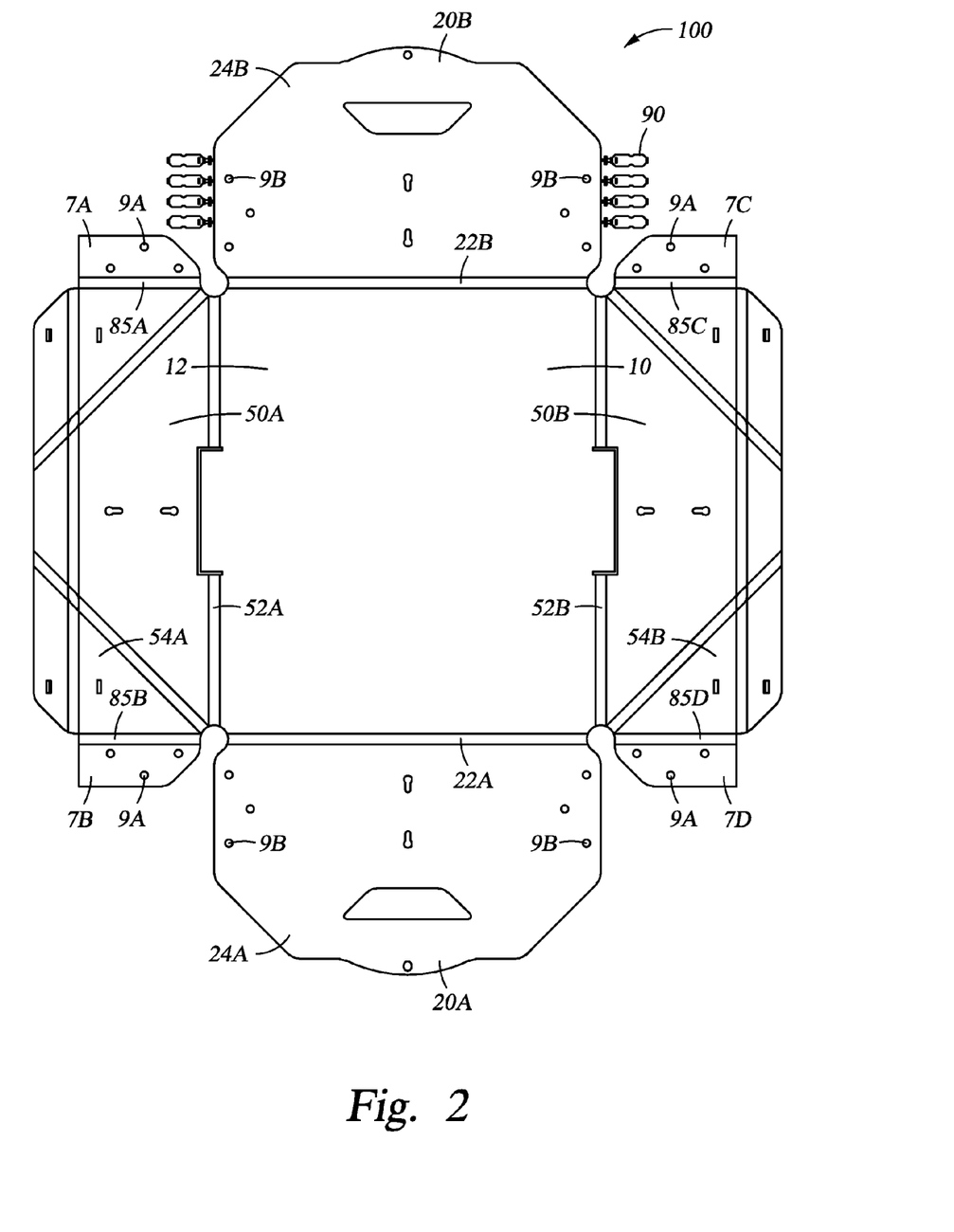
FIG. 2 is a top view of the collapsible container as it exits an injection molding apparatus, but before side walls and end walls are fused together.

The container 100 may be constructed from injected molded polypropylene, and may be fabricated as a solid, unitary piece (see FIG. 2). When constructed of polypropylene, the container 100 is considerably strong and resilient, and the hinges are durable. The polypropylene may include a pattern 5 (see FIG. 1) which alternates between thicker truss-like portions with thinner triangular sections within the truss-like portions. The use of the thick and thin pattern 5 decreases the overall weight of the container 100, making the container 100 easier to use and manipulate, and the thicker truss-like design provides strength to the container 100.

FIG. 2 illustrates the container 100 after it has come out of an injection molding apparatus wherein the container 100 is a flat, unitary piece. Locking hooks 90 (which will be described herein) are also formed during the injection molding process and attached to one or more welding flaps 7A-D. To fabricate the container 100, the hooks 90 are first removed from the flat container 100. The side walls 50A, B are folded along side wall live hinges 52A, B toward an inner portion 12 of the base 10 to a substantially perpendicular or ninety degree angle to the base 10. The welding flaps 7A-D are folded along welding flap live hinges 85A-D toward an inner portion 54A, B of the side walls 50A, B to a substantially perpendicular or ninety degree angle to the side walls 50A, B. The end walls 20A, B are folded along end wall live hinges 22A, B toward the inner portion 12 of the base 10 to a substantially perpendicular or ninety degree angle to the base 10. The welding flaps 7A-D, which have been folded to a substantially perpendicular position to the side walls 50A, B, are placed on the inside portion 24A, B of the end walls 20A, B, wherein raised welding flap nodules 9A on the welding flaps 7A-D are received by reciprocal welding flap indentions 9B on the end walls 20A, B. The welding flaps 7A-D are welded to the end walls 20A, B in this position via plastic welding, such as radio frequency ("RF") welding. Once welded, the welding flap live hinges 85A-D become the hinges between the end walls 20A, B and side walls 50A, B, and the collapsible container 100, with unfolded flaps 60A, B results (as shown in FIG. 7.)

Turning back to FIG. 1, the collapsible container 100 in its unfolded and locked state has flaps 60A, B folded into the container 100. The flaps 60A, B are folded along flap live hinges 65A, B to the inner portion 54A, B of the side walls 50A, B, approximately 180 degrees until the flaps 60A, B are adjacent to the side walls 50A, B (see FIG. 5 for a detailed view of a flap 60 locked into the side wall 50). Locking tabs 70A-D located on an inner portion 62A, B of the flaps 60A, B secure the flaps 60A, B to the side walls 50A, B.

Figures 3, 4, 5, 6:
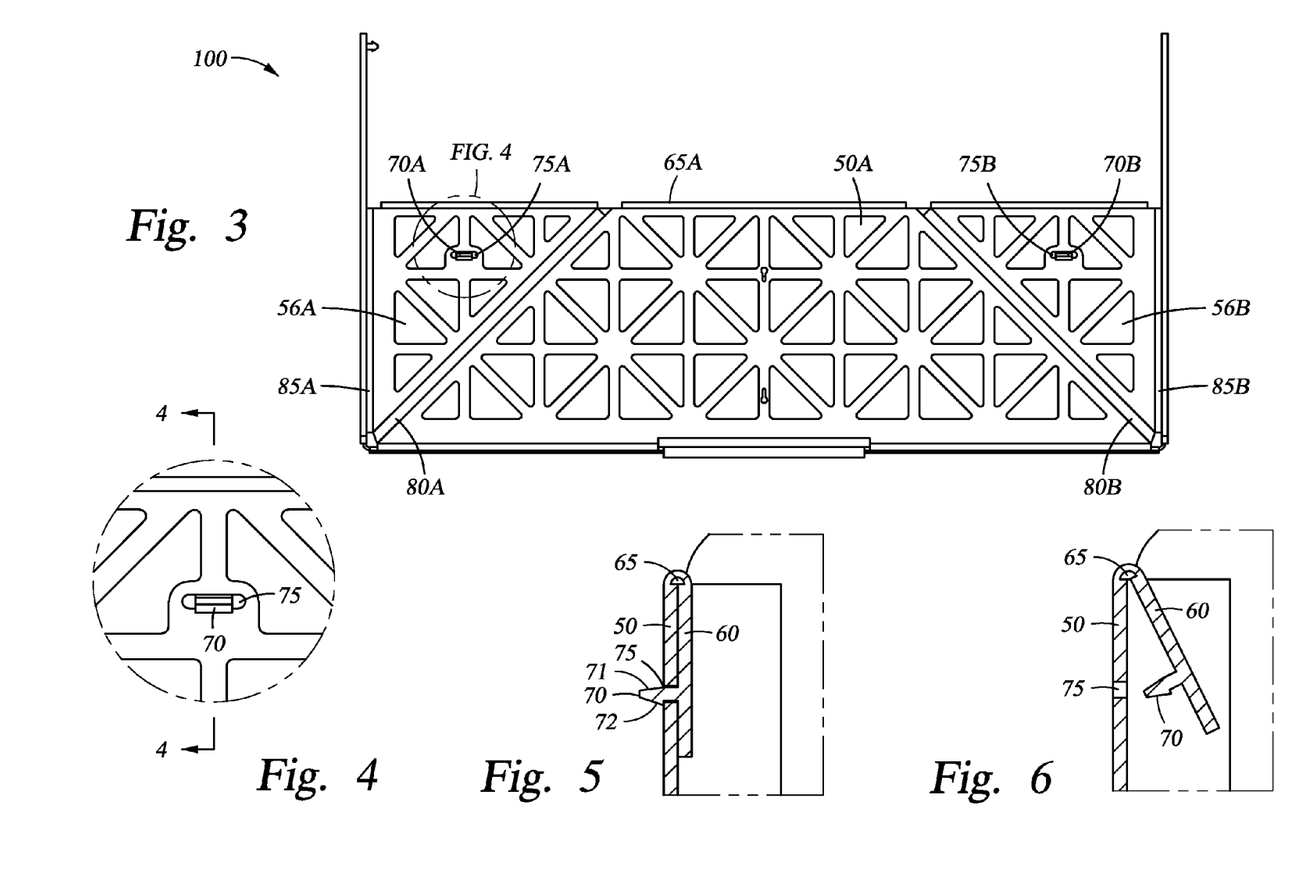
FIG. 3 is a side view of the collapsible container.
FIG. 4 is a detailed view of a tab locking mechanism between the side wall and a flap in the collapsible container.
FIG. 5 is a cross sectional view of the locking mechanism between the side wall and the flap in the collapsible container, wherein a tab is inserted through a tab receiver in the side wall.
FIG. 6 is a cross sectional view of the flap being unfolded from the side wall, wherein the tab is removed from the tab receiver in the side wall.

FIG. 3 is a side view of the collapsible container, showing the side wall 50A with flap 60 folded into the container 100 (not visible). The opposite side wall 50B is similar in construction, except where noted. FIG. 3 shows the approximate position of the locking tabs 70A, B and tab receivers 75A, B to the side wall 50A. Tab receivers 75 are small openings within the side walls 50 which are sized to fit tabs 70 (see FIG. 4). The tab receivers 75A, B are located within triangular sections 56A, B of the side wall 50A defined by folding hinges 80A, B, flap live hinge 65A and welding flap live hinges 85A, B. The tab receivers 75A, B are positioned in a reciprocal position to the tabs 70A, B on the flaps 60A, B (when the flaps 60A, B are folded), and therefore may not be further down the side wall 50A than the height of the flap 60A. The tabs 70A, B may include a triangular cross section as shown in FIGS. 5 and 6, wherein a first side 71 of the tab 70 is substantially perpendicular to the flap 60, and a second side 72 of the tab 70 is angled. As shown in FIG. 5, the angled side 72 is located on a bottom side of the tab 70 (when the flap 60 is folded into the side wall 50.) This tab configuration allows the tab 70 to be easily received by the tab receiver 75, but difficult to remove without manipulation. When the angled portion of the tab 70 is pushed up and through the side wall 50A, the flap 70 is unlocked from the side wall 50, as shown in FIG. 6, and may be rotated up to the vertical position in line with the side wall 50.

Figure 7:
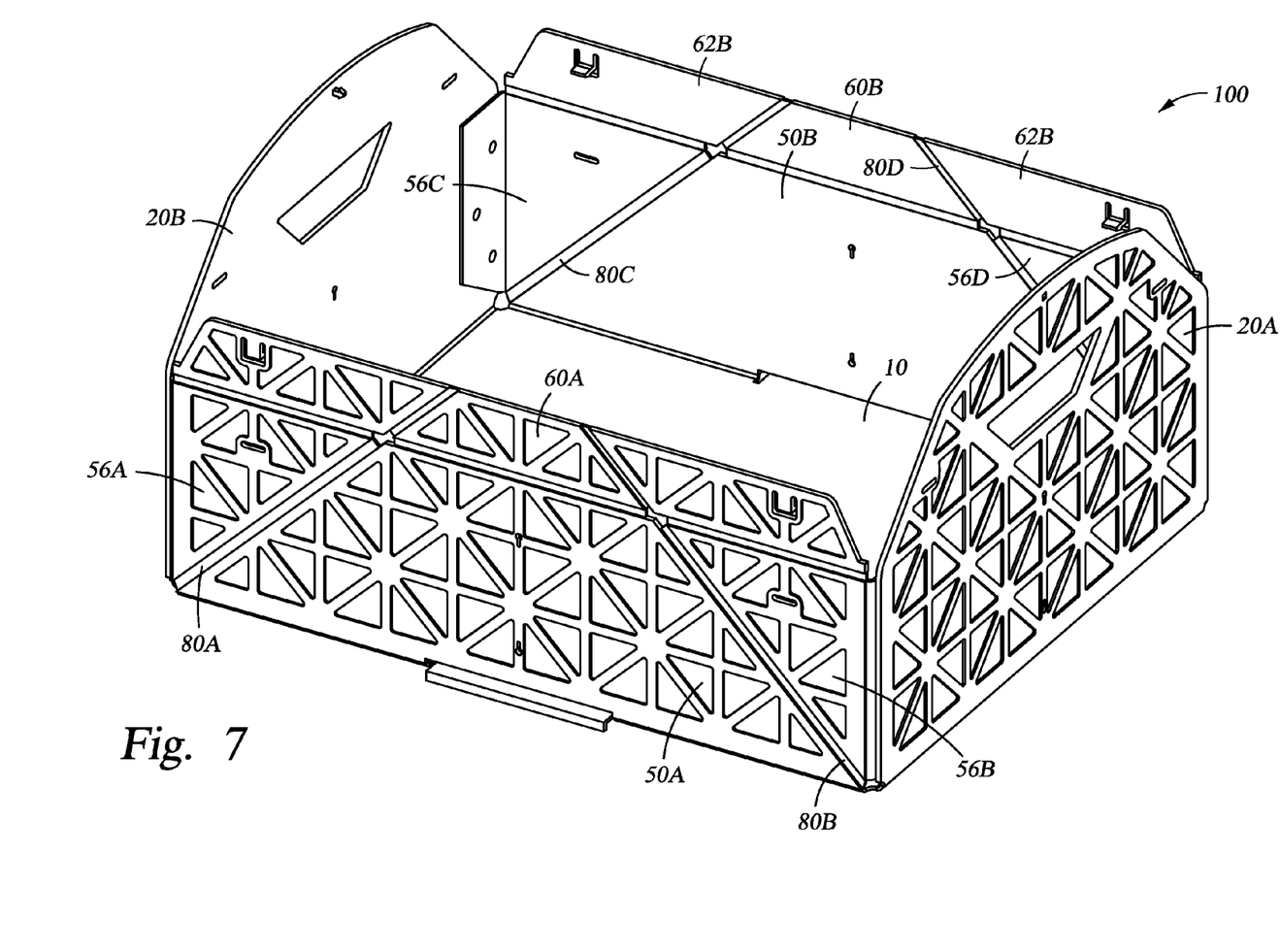
FIG. 7 is a perspective view of the collapsible container, wherein the flaps have been unfolded into a vertical alignment with the side walls.

FIG. 7 is a perspective view of the collapsible container 100, wherein the flaps 60A, B have been unfolded into a vertical alignment with the side walls 50A, B. To fold the container 100, the flaps 60A, B are extended into the vertical alignment with the side walls 50A, B. As seen in FIG. 7, the folding hinges 80A, B continue from the side walls 50A, B and to the flaps 60A, B, thereby continuing the triangular sections 56A-D into the flaps 60A, B, as well.

Figure 8:
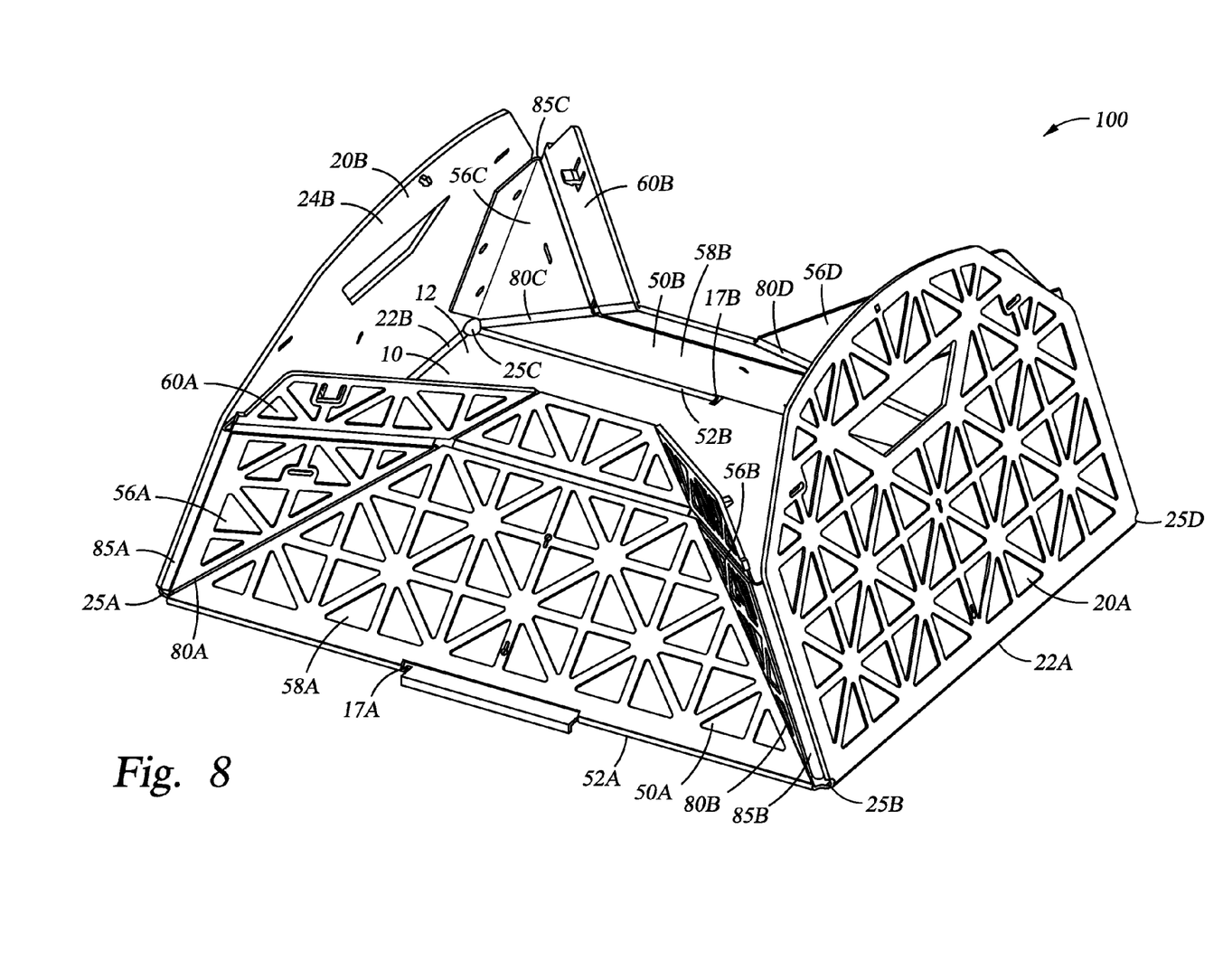
FIG. 8 is a perspective view of the collapsible container as it is being collapsed.

FIG. 8 is a perspective view of the container 100 as it is being collapsed. Four gaps 25A-D at the corners of the container 100 allow the container 100 to be easily folded. Similarly, a small lip gap 17A, B above the stacking lips 15A, B allow the container 100 to be easily folded. The lip gaps 17A, B may have a height of approximately the width of the side walls 50A, B to allow the side walls 50A, B to lie flat when completely collapsed.

As the container 100 is being collapsed, a middle portion 58A, B of the side walls 50A, B and flaps 60A, B push toward the inner portion 12 of the base 10, along side wall live hinges 52A, B. At the same time, triangular sections 56A-D (including the extensions into the flaps 60A, B) are rotated away from the inner portion 12 of the base 10, pivoting both along welding flap hinges 85A-D and along folding hinges 80A-D, which rotate at a substantially 45 degree angle. End walls 20A, B are rotated toward the inner portion 12 of the base 10, along end wall live hinges 22A, B at the same time, as well. When the middle portions 58A, B of the side walls 50A, B and flaps 60A, B are rotated to that the middle portions 58A, B lie flat on the inner portion 12 of the base 10 (inner portions together), exterior portions of the triangular sections 56A-D meet the top of exterior portions of the middle portions 58A, B of the side walls 50A, which allow the inner portions of the triangular sections 56A-D to meet the inner portions 24A,B of the end walls 20A, B. Further, the tabs 70A-D, which are located on the inner portion of the flaps 60A, B are placed in a vertical position, or a position that is perpendicular to the collapsed container 100, and meet the inner portions 24A, B of the end walls 20A, B.

Figures 9, 10, 11:
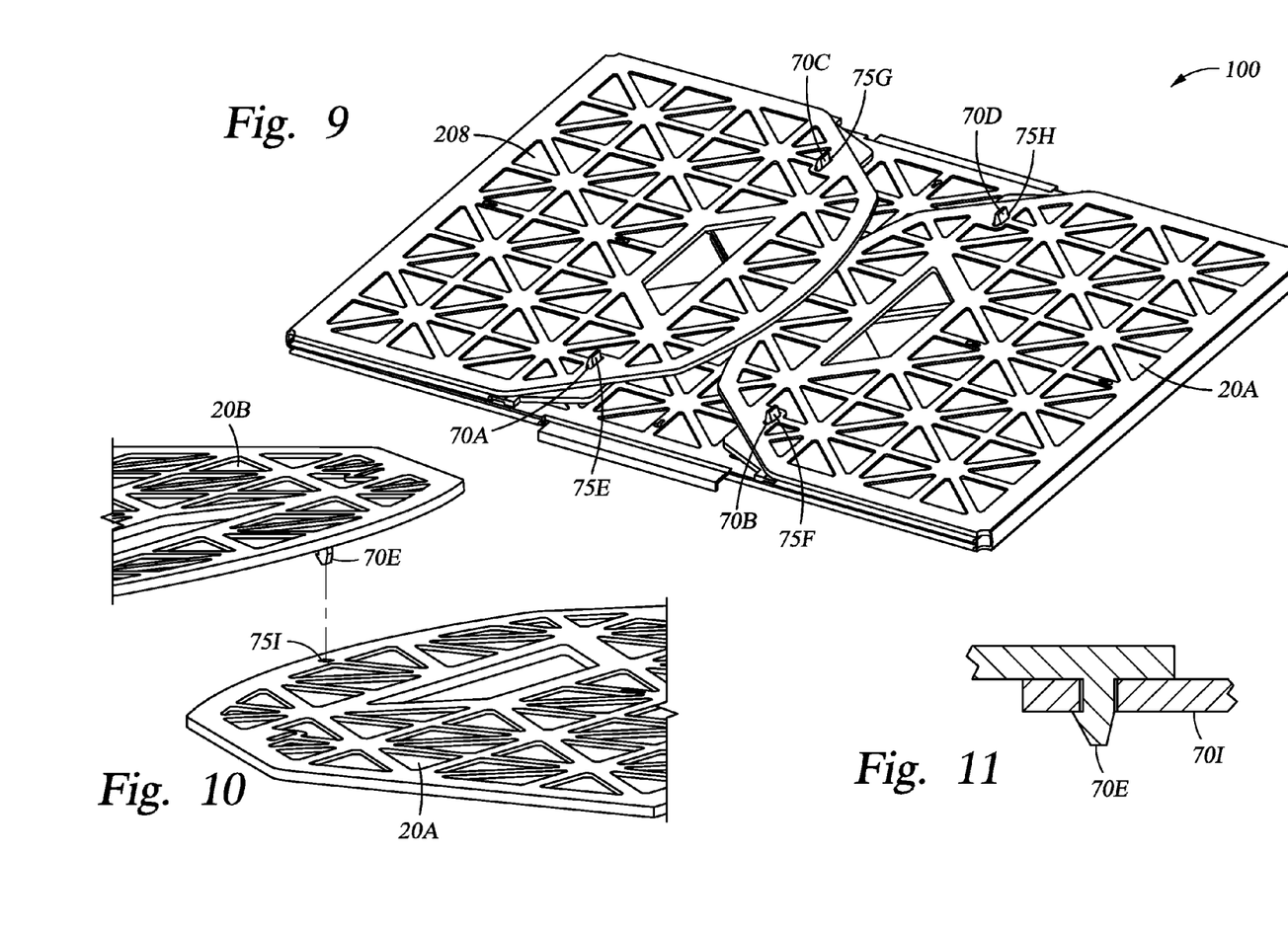
FIG. 9 is a perspective view of the collapsible container in a collapsed state.
FIG. 10 is a cutaway view of two end walls as they are about to be locked together.
FIG. 11 is a detailed side view of a locking mechanism between the two end walls.

FIG. 9 is a perspective view of the collapsible container 100 in a collapsed state. The tabs 70A-D that are perpendicular to the base 10 (when collapsed) fit through reciprocal tab receivers 75E-H in the end walls 20A, B to lock the container 100 into a collapsed position. In addition, a locking tab 70E is positioned centrally on a top portion of one end wall 20B, and a tab receiver 75I is reciprocally positioned on the other end wall 20A (shown in FIG. 10). In the collapsed state, the locking tab 70E is placed in the tab receiver 75I to lock the end walls 20A, B together, and lock the container 100 into its collapsed position. FIG. 11 shows locking tab 70E and tab receiver 75I, which operates in substantially the same manner as locking tabs 70A-D and receivers 75A-H.

Figure 12:
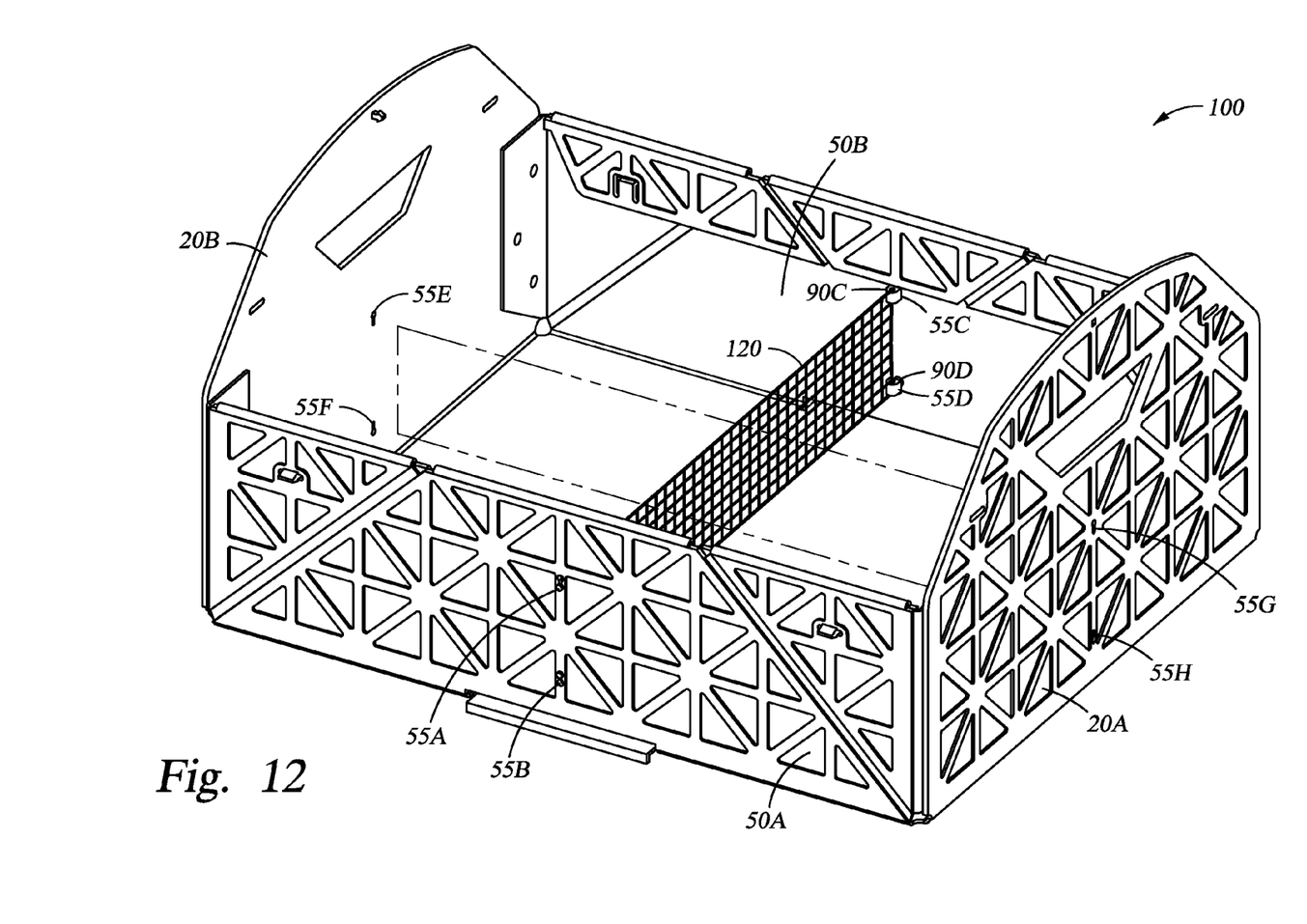
FIG. 12 is a perspective view showing another embodiment of the collapsible box, wherein a net is inserted into the container to create partitions.
Figure 13:
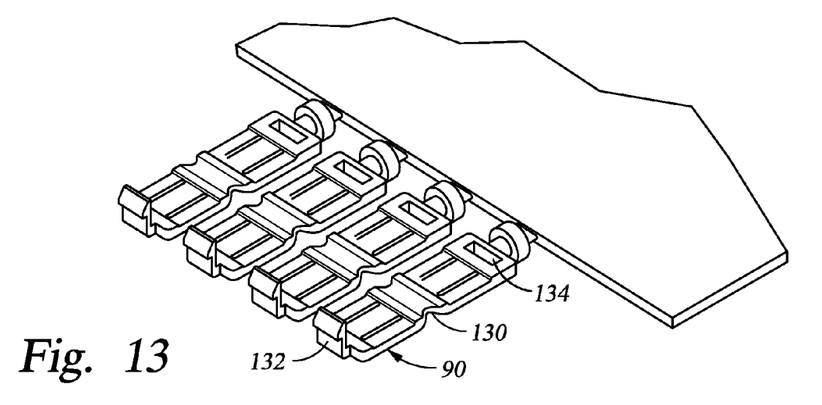
FIG. 13 is a perspective view of a hook used to fasten the net to the container, before it has received the net.
Figure 14:
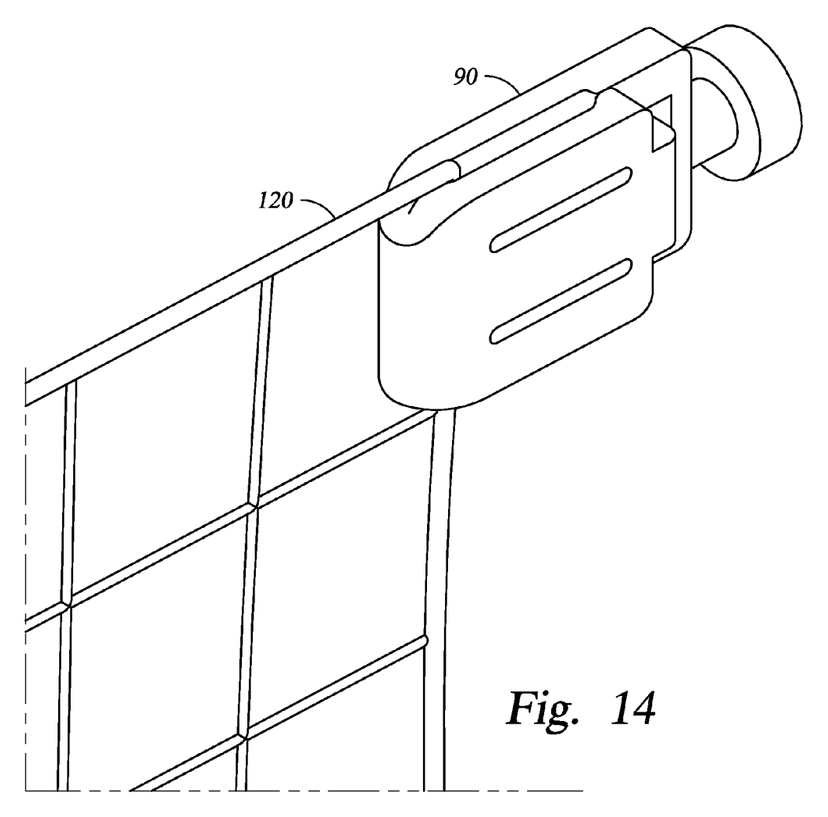
FIG. 14 is a perspective view of the hook fastened to the net.

In another embodiment of the container 100, a net 120 is inserted into the container 100 to create partitions as shown in FIG. 12. The hooks 90 that were removed from the container 100 after it came out of the injection molding apparatus (see FIG. 13) are threaded through the net 120 to the hook midsection 130, and the hooks 90 are folded at their midsection 130 and snapped together by placing a hook tab 132 through a hook receiver 134 (see FIG. 14). Hooks 90 are placed at each corner of the net 120 (see FIG. 15). Depending on the length of the net 120 and style of the net 120, the net could separate the container across its width, length, or diagonally. The hooks 90 are inserted into net receivers 55, which have a key like appearance (see FIG. 12). The hooks 90 are first placed in a wider portion of the net receivers 55, and then slid into a narrow portion of the net receivers 55 so that the hooks are held in place.

In FIG. 12, hooks 90A-D are placed in net receivers 55A-D, which are centrally and vertically located on the side walls 50A, B, which allows the net 120 to separate the container into two partitions widthwise. The container 100 in FIG. 12 also shows net receivers 55E-H at a central and vertical position on the end walls 20A, B, which could receive hooks 90 for purposes of placing the net 120 to separate the container into partitions lengthwise. Alternatively, a net 120 could be fabricated such that the container 100 may be separated into four partitions, both lengthwise and widthwise. While the container 100 shown in FIG. 12 only has eight hook receivers 55A-H, the container 100 may contain many other net receivers 55 for partitioning the container 100 in various ways. For example, four sets of net receivers 55 (a set being 2 receivers 55 per opposing wall) could be located along the length of the side walls 50A, B, which would provide five partitions along the length of the container 100. The container 100 could also be divided diagonally by use of one or more nets 120 and net receivers 55.

Figure 15:
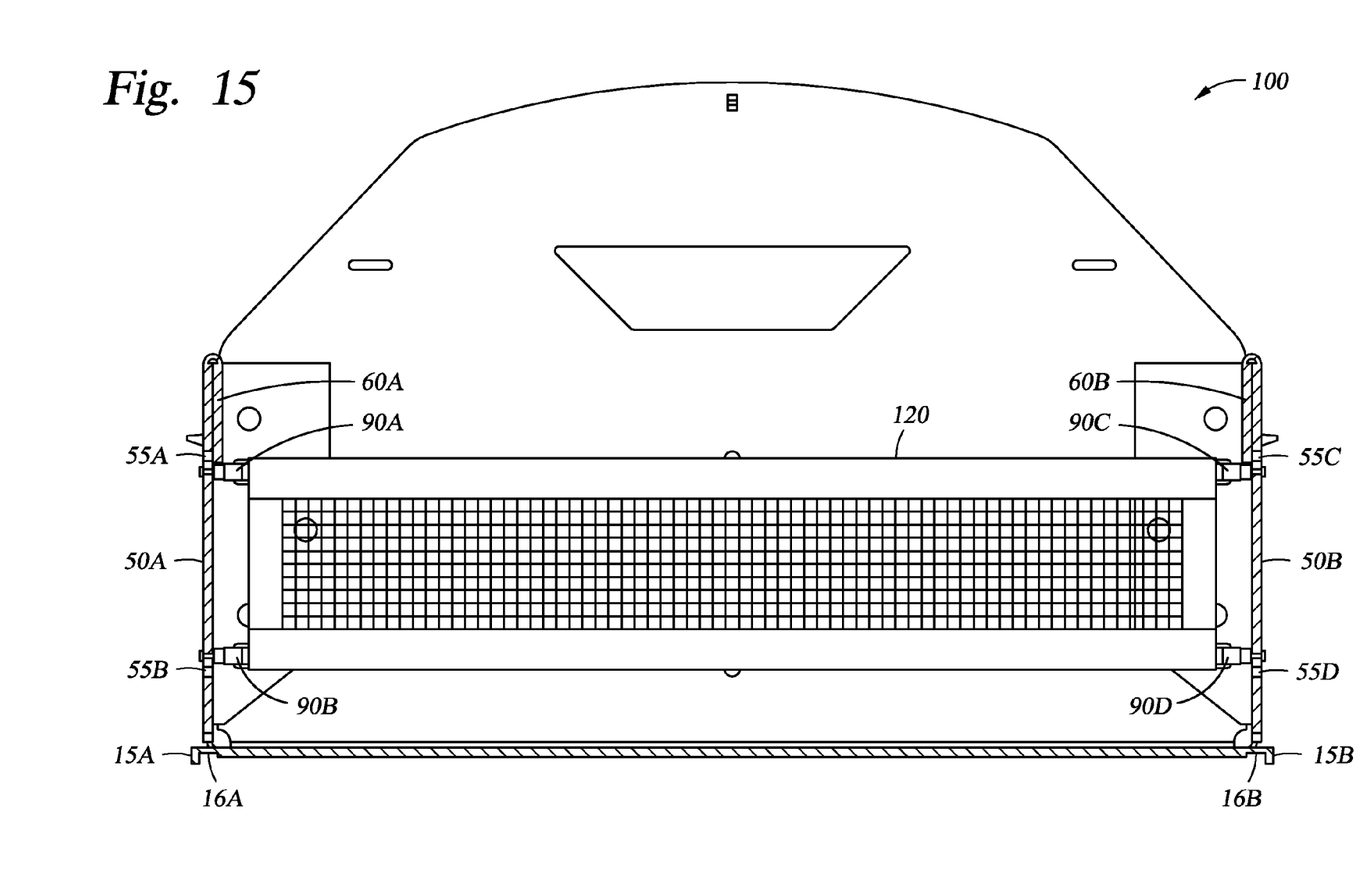
FIG. 15 is a cross section of the collapsible container showing the net inserted into the container.

FIG. 15 is a cross section of the container 100 showing the net 120 inserted into the container 100 at its midsection lengthwise, as shown in FIG. 12. When the hooks 90A-D are placed through the net receivers 55A-D, the net 120 is placed in tension across the width of the container 100. The top net receivers 55A, C may be placed in a position where the flaps 60A, B cover the wide portion of the top net receivers 55A, C, when the flaps 60A, B are folded and locked into the side walls 50A, B. The net 120 may also be locked into the container, because the hooks 90A, C may not escape the receivers 55A, C when the wide portion is covered by the flaps 60A, B.

Figure 16:
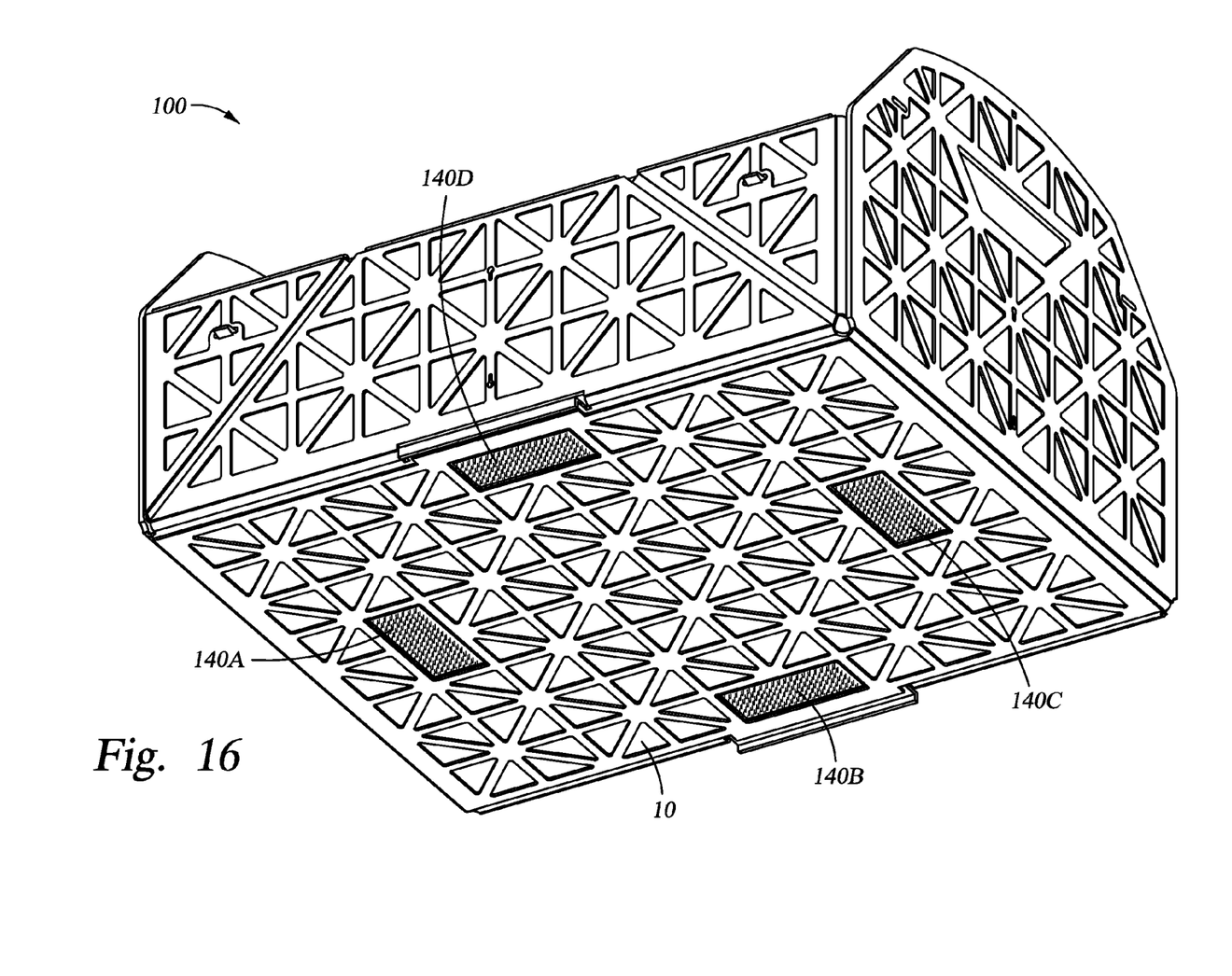
FIG. 16 is a perspective view of an embodiment of the collapsible container showing a bottom view of a base with adhesive strips attached to the base.

In another embodiment, the container 100 contains adhesive strips 140 on its exterior. FIG. 16 shows four adhesive strips 140 on the base 10 of the container 100, but adhesive strips 140 could be placed on the exterior of the side walls 50A, B or end walls 20A, B as well. Adhesive strips 140 may be hook-and-loop, rubber gripping material, or any other desired material that allows the container 100 to grip or adhere to a particular surface so that the container 100 stays in place. For example, hook-and-loop adhesive strips 140A-D placed in the positions indicated in FIG. 16 would be an exemplary embodiment of the container 100, which would prevent the container 100 from moving around in a trunk of a car.

Figure 17:
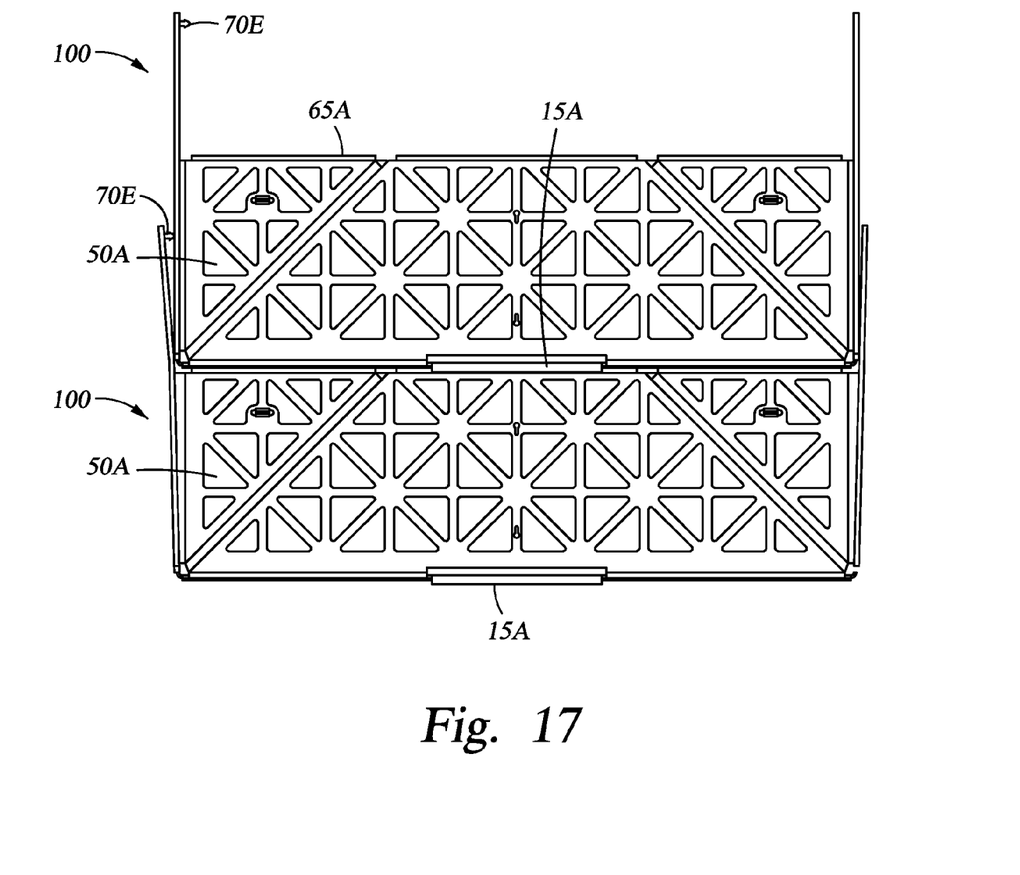
FIG. 17 is a side view showing a method of stacking two unfolded collapsible boxes on top of each other.

FIG. 17 shows an exemplary method for stacking two or more containers 100. When the flaps 60A, B are folded and locked into the end walls 50A, B, the stacking lips 15A, B sit on the flap live hinges 65A, B, which join the side walls 50A, B and flaps 60A, B together. As shown in FIG. 15, the stacking lips 15A, B created grooves 16A, B that allow one container 100 to seat itself on a second container 100.

Turning back to FIG. 17, although an end wall 20A may include one tab 70E in its upper portion which could interfere with the stacking process, because the container 100 material may be polypropylene, the end walls 20A, B may slightly deform outwardly to enable multiple containers 100 to be stacked without damaging the container 100. In addition to stacking the containers 100 in their open, locked position, the containers 100 may also be stacked in their folded, locked position.

While the foregoing is directed to embodiments of the present invention, other and further embodiments of the invention may be devised without departing from the basic scope thereof, and the scope thereof is determined by the claims that follow.

The invention claimed is:

1. A collapsible container of unitary construction having rigid wall portions comprising:
  a base;
  two opposing end walls that are pivotably attached to the base, wherein the height of the end walls are at least more than one-half the length of the base to allow a top portion of the end walls to overlap and lock when both end walls are collapsed onto the base; and
  two opposing side walls that are pivotably attached to the base and to the end walls, each of the sidewalls including a flap extending from a top portion thereof, the flap portions including a tab extending therefrom,
  wherein when the collapsible container is in an open position, the flap may be folded inwardly of the collapsible container such that the tab extends into the side wall to which the tab is pivotably attached, and
  wherein when the collapsible container is in a collapsed configuration, the tabs extend into an end wall.

2. The container of claim 1, wherein the tab includes a plurality of tabs extending from each of the two opposing sidewalls; and
  the plurality of tabs extends inwardly into a plurality of tab receiving holes.

3. The container of claim 1, wherein the collapsible container further includes a living hinge between each end wall and the base, between each side wall and the base, and between each adjacent end wall and side wall.

4. The container of claim 1, wherein the end walls and side walls are substantially perpendicular to the base when in the open position.

5. The container of claim 1, wherein the base has at least one stacking lip on each side that adjoins the side walls.

6. The container of claim 1, wherein a bottom side of the base contains one or more adhesive strips.

7. The container of claim 1, wherein hooks fasten one or more nets inside the collapsible container to provide divided sections.

8. The container of claim 1, wherein the collapsible container further includes a tab on one end wall and a tab receiving hole on the opposing end wall, the tab receiving hole for receiving the tab when the end walls are collapsed onto the base and locked into the flattened position.

* * * * *